United States Patent [19]

Schrader et al.

[11] Patent Number: 5,029,934
[45] Date of Patent: Jul. 9, 1991

[54] DOOR HOOKING ARRANGEMENT ON MOTOR VEHICLES

[75] Inventors: Pieter-Jan Schrader, Flacht; Georg Schumann, Leonberg, both of Fed. Rep. of Germany

[73] Assignee: Dr. Ing. H.C.F. Porsche AG, Fed. Rep. of Germany

[21] Appl. No.: 598,437

[22] Filed: Oct. 16, 1990

[30] Foreign Application Priority Data

Oct. 17, 1989 [DE] Fed. Rep. of Germany ....... 3934524

[51] Int. Cl.⁵ .............................................. B60J 5/04
[52] U.S. Cl. .................................... 296/146; 296/188; 49/502
[58] Field of Search ................... 296/146, 188; 49/502

[56] References Cited

U.S. PATENT DOCUMENTS

| | | | |
|---|---|---|---|
| 4,917,433 | 4/1990 | Tomforde | 296/146 |
| 4,936,621 | 6/1990 | Shimada et al. | 296/188 |

FOREIGN PATENT DOCUMENTS

| | | | |
|---|---|---|---|
| 2444018 | 3/1976 | Fed. Rep. of Germany | 296/146 |
| 7805650 | 9/1979 | France | |
| 2171367 | 8/1986 | United Kingdom | 296/146 |

*Primary Examiner*—Robert R. Song
*Attorney, Agent, or Firm*—Evenson, Wands, Edwards, Lenahan & McKeown

[57] ABSTRACT

A door hooking arrangement on motor vehicles for the protection against a lateral impact in the case of accidents comprises a hook arranged in the lower area of the door which, in the case of a lateral crash impact on the door, interacts with a receiving device provided on the exterior vehicle side member. In order to avoid injury of the vehicle user during the leaving and entering or during the cleaning of the vehicle, it is provided that the hooking elements (hook, receiving device), in the normal condition, are covered by covering parts and that, in the case of a lateral crash impact on the door, starting from a defined effect of force, wall sections of the covering parts arranged adjacent to the hooking elements break open and release the hooking elements.

14 Claims, 4 Drawing Sheets

DOOR HOOKING ARRANGEMENT ON MOTOR VEHICLES

BACKGROUND AND SUMMARY OF THE INVENTION

The invention relates to a door hooking arrangement on motor vehicles for the protection against a lateral impact in the case of accidents with a hook being arranged which forms a hooking element at least in the lower area of the door, said hook interacting with a receiving device provided on the exterior vehicle side member in the case of a lateral crash impact on the door in a hooking manner.

A door hooking arrangement of the initially mentioned type is known from the French Patent Document 2 418 111, in which a reinforcing plate having a hook is arranged on the door, and a corresponding receiving device is arranged on the side member. This arrangement has the disadvantage that, when the door is open, the hooking element on the door side as well as the hooking element on the side-member side form projecting components which may lead to injury during the leaving and the entering as well as during the cleaning of this vehicle area. In addition, the projecting exposed components of the door hooking arrangement have a negative influence on the overall stylistic appearance of the vehicle.

It is an object of the invention to take such measures on a door hooking arrangement that, while the arrangement functions well, the vehicle user cannot be injured while entering or leaving the vehicle or when cleaning the vehicle.

According to the invention, this object is achieved by means of an arrangement wherein the hook and receiving device are covered by covering parts in the normal condition and wherein, in the case of a lateral crash impact on the door, starting from a defined effect of force, wall sections of the covering parts arranged adjacent to the hook and receiving device break open and release the hook and receiving device.

The principal advantages achieved by means of the invention are that the elements of the door hooking arrangement are covered by the arrangement of covering parts provided with predetermined breaking points when the door is open, and thus no injuries can be caused by projecting parts during the entering and leaving or during the cleaning of this vehicle area. However, a good functioning of the door hooking arrangement is ensured in the case of a lateral crash impact on the car because the predetermined breaking points will break open in case of a corresponding effect of force and thus ensure an effective hooking-together of the door and the side member.

Other objects, advantages and novel features of the present invention will become apparent from the following detailed description of the invention when considered in conjunction with the accompanying drawings.

DETAILED DESCRIPTION OF THE DRAWINGS

Figure 1:
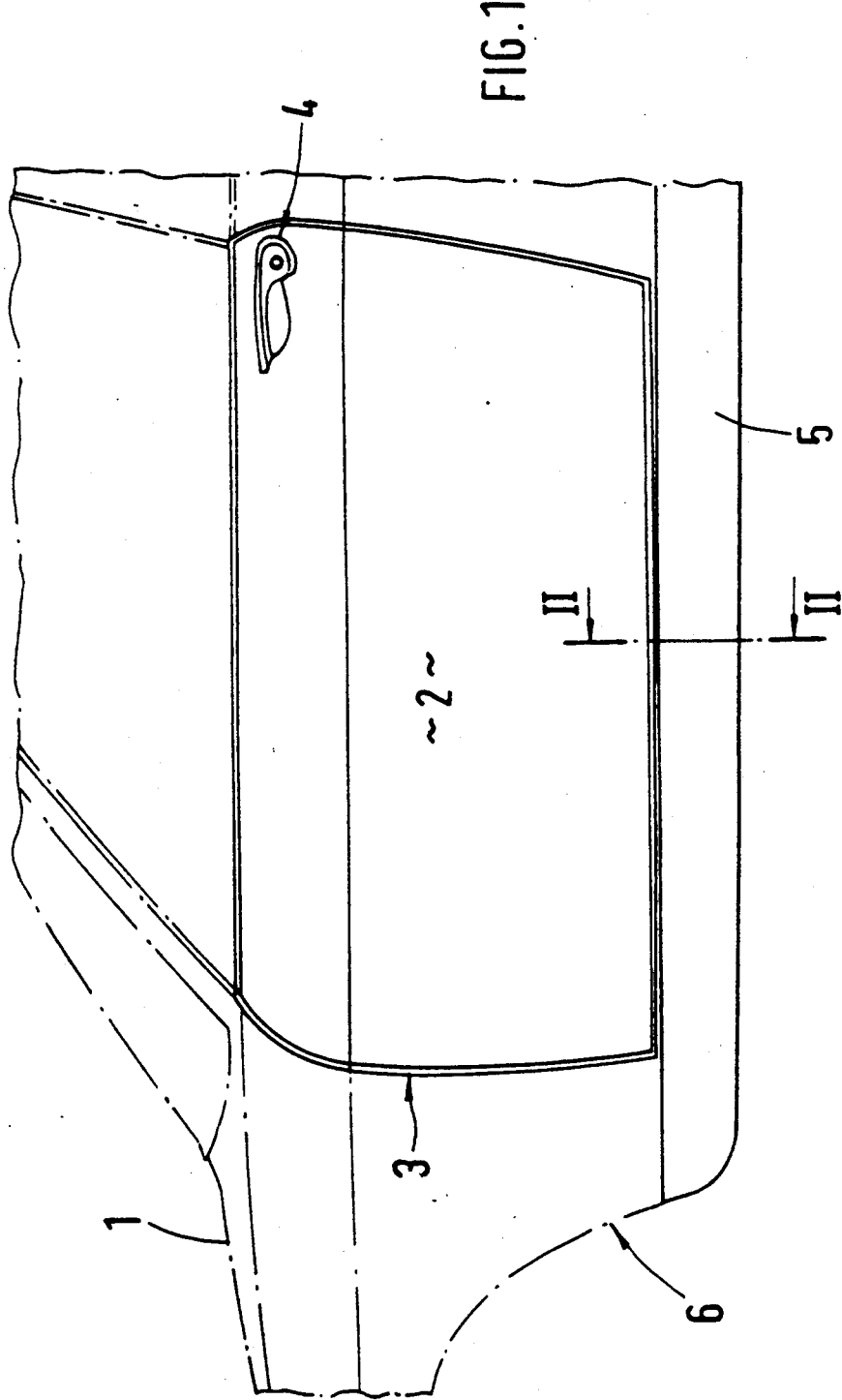
FIG. 1 is a schematic lateral view of a vehicle door and the surrounding parts of the vehicle body, with an arrangement constructed according to a preferred embodiment of the invention.

A door 2 of a motor vehicle 1 is shown which can be swivelled around a vertical axis at 3 and can be locked by a lock at 4. An exterior vehicle side member 5 extends below the door 2, the front end of this side member 5 extending to a wheel house 6 (FIG. 1).

Figure 2:
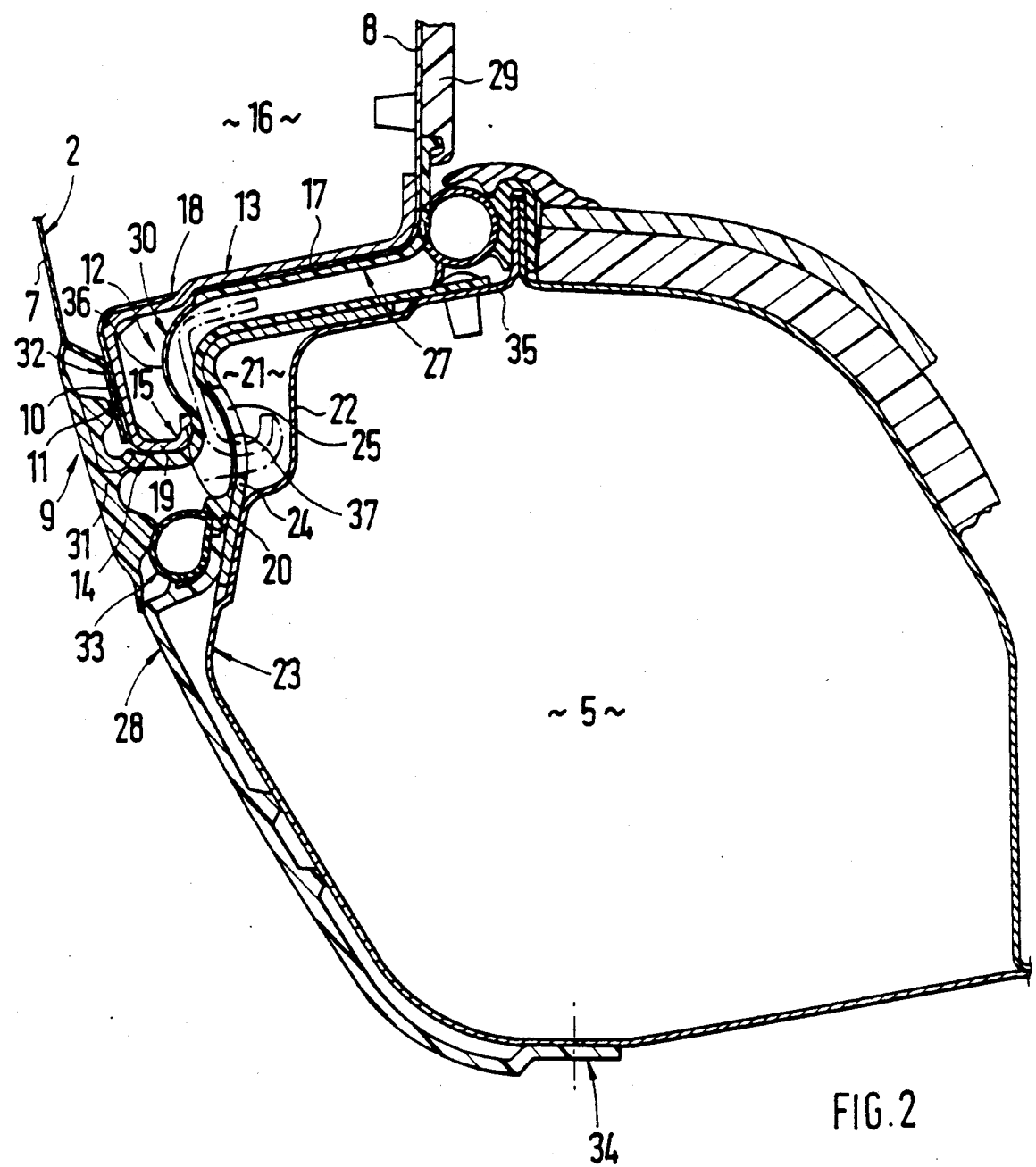
FIG. 2 is an enlarged sectional view taken along Line II—II of FIG. 1.

According to FIG. 2, the door 2 comprises an outside panel 7 and an inside panel 8 which are firmly connected with one another in the lower area 9 at the upright flanges 10, 11 extending in the same direction (for example, by means of spot welding).

For the protection against a lateral impact in the case of accidents, a door hooking arrangement 12 is provided at least in the lower area 9 of the door 2 which, on the door side, reaches around a reinforcing plate 13 the bottom free end 14 of which is constructed as a hook 15. The profiled reinforcing plate 13 extends outside the inside panel 8 in the area of the hook 15, whereas an adjacent section is arranged inside the inside panel 8 covered in the door body 16. Adjacent to an upright flange 11, the inside panel 8 has a diagonal wall section 17 at which a passage opening 18 is provided for the reinforcing plate 13.

Figure 4:
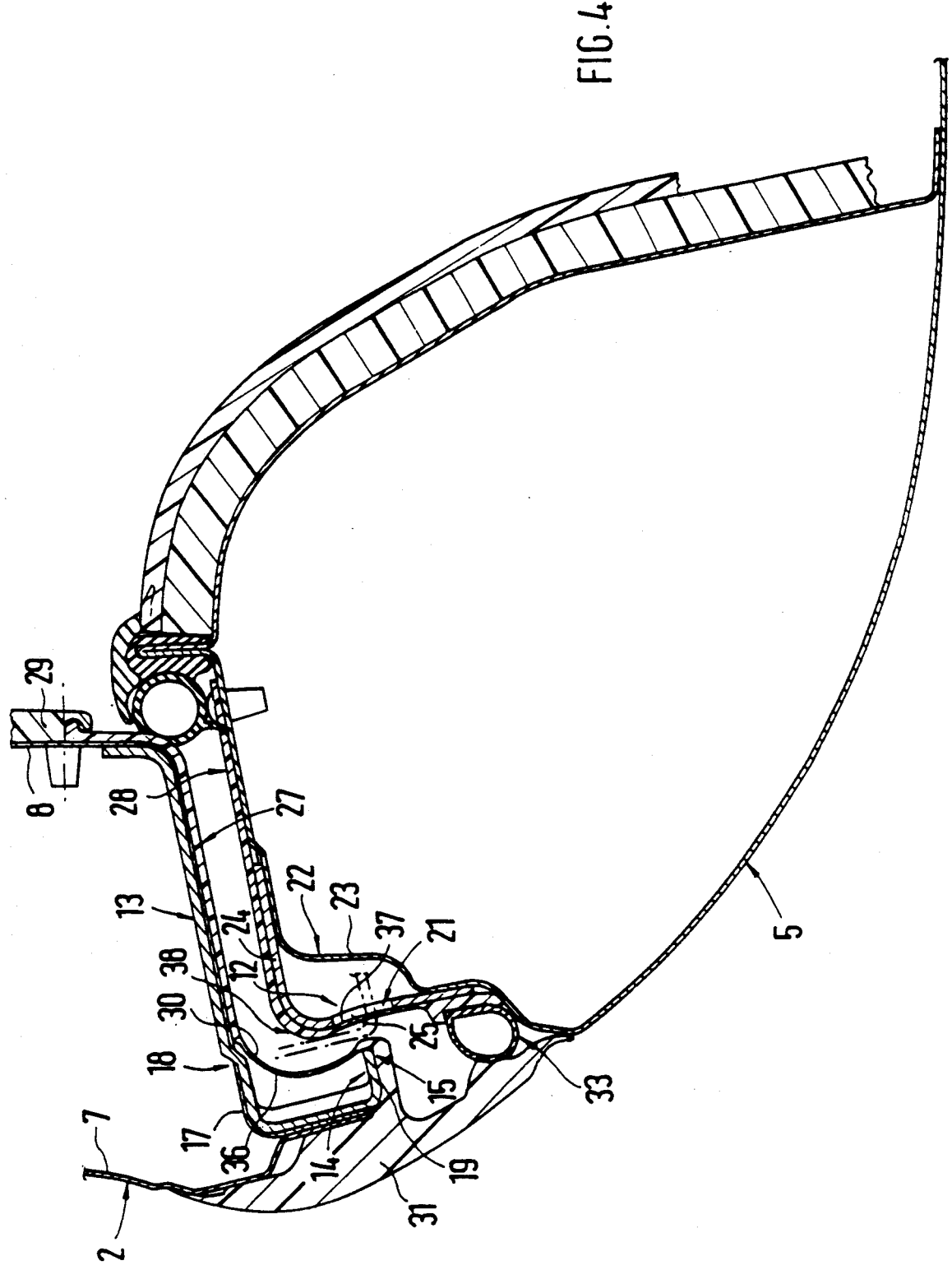
FIG. 4 is a sectional view similar to FIG. 3 of another embodiment of the door hooking arrangement.

In areas, the reinforcing plate 14 rests against the underside of the wall section 17 and against the side of the flange 11 facing the side member 5 of the vehicle and is held in position there by means of welding. The free end 14 of the reinforcing plate 13 arranged adjacent to flanges 10, 11 is developed as a hook 15. This hook 15 comprises an approximately horizontal wall section 19 and an upwardly projecting web 20. The web 20 extends adjacent to a side-member side receiving device 21 of the door hooking arrangement 12 (FIG. 2). Corresponding to FIG. 4, the hook 15 is formed only by the horizontal wall section 19, the free end of which faces the receiving device 21.

Figure 3:
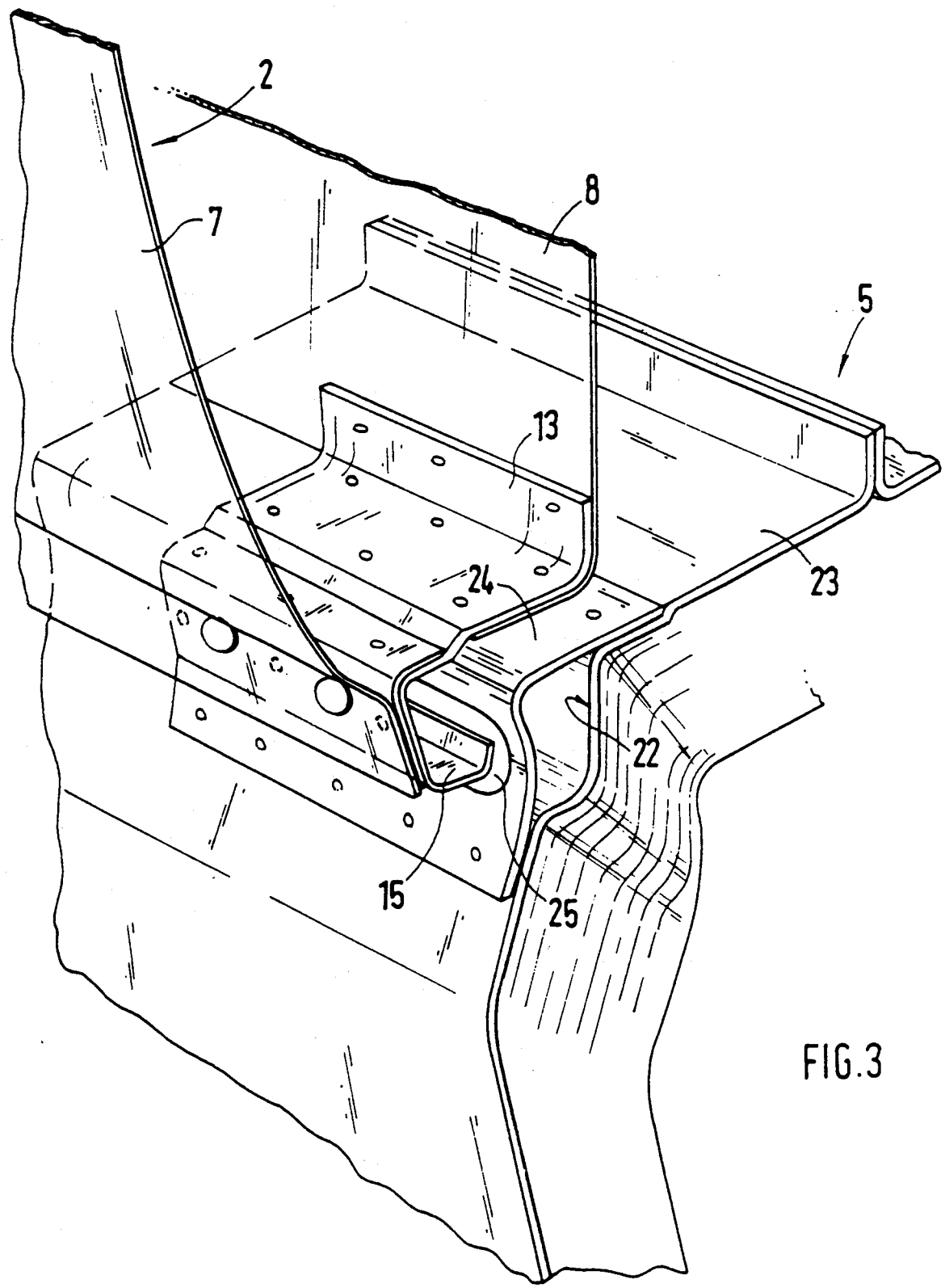
FIG. 3 is a perspective representation of the door hooking arrangement of a preferred embodiment of the invention without the covering parts.

The receiving device 21 is formed by a recess-shaped indentation 22 of an outer panel 23 of the side member and by an angularly profiled closing part 24, the closing part 24 being placed on the indentation 22 from the side or from above and closing it off. On the side facing the hook 15, the closing part 24 is provided with an elongated horizontally directed slot opening 25. The slot opening 25 extends beyond the hook 15 in the upward and in the downward direction. In addition, the slot opening 25 has a slightly larger longitudinal dimension than the hook 15 (FIG. 3).

According to FIG. 2, the lower area 9 of the door 2, including the reinforcing plate 13 and the hook 15, as well as an exterior area of the side member 5 of the vehicle containing the receiving device 21 are provided with a covering part 27, 28. Both covering parts 27, 28 are made of plastic, rubber or the like.

The door-side covering part 27 extends from an interior lateral covering 29 of the door 2 perpendicularly downward and then along the diagonal wall section 17 toward the outside. Then a circular section 30 of the door covering 27 extends downward and reaches around the free end 14 of the reinforcing plate 13 by means of the hook 15. A connecting profiled upright end area 31 covers an impression 32 of an outer panel 7 and extends downward to a sealing body 33 of the side member 5 of the vehicle.

The covering part 28 on the side-member side surrounds at least a partial area of the exterior side of the side member 5 of the vehicle and, at the bottom at 34 and at the upper boundary surface 35, is connected with the side member 5 of the vehicle (FIG. 2). In the upper area, the covering part 28 rests against the exterior side of the closing part 24 or of the outer panel 23 of the side member. According to FIG. 4, the covering part 28 covers only an upper partial area of the side member 5 of the vehicle containing the receiving device 21, whereas the area situated below the sealing body 33 is not covered. The door-side covering part 27 and the covering part 28 on the side-member side have wall sections arranged adjacent to the hooking elements (hook 15, receiving device 21) which, in the case of a lateral crash impact on the door 2, break open started at a defined effect of force and release the hooking elements 15, 21. The wall sections which open up are constructed as predetermined breaking points 36, 37. These predetermined breaking points 36, 37 will break open starting from a defined effect of force by the interaction of the door 2 and the vehicle side member 5 in such a manner that an effective hooking-together of the door 2 and of the vehicle side member 5 is ensured. The hooked connection is shown by a dash-dotted line in FIG. 2. The door hooking arrangement will function particularly well if the hooking elements (hook 15, receiving device 21) are constructed in an approximate S-shape.

In the normal condition of the door 2 and the vehicle side member 5, the elements 15, 21 of the door hooking arrangement 12 are not visible because of the covering parts 27, 28.

The desired breaking point 36 on the door side extends above the hook 15 to the obliquely extending wall section 17 and has a circular course which is bent toward the outside.

The desired breaking point 37 on the side-member side is disposed in front of the slot opening 25 of the receiving device 21 and, viewed in the vertical direction, slightly projects beyond the slot opening 25 in the upward and the downward direction. According to FIG. 2, the desired breaking point 37 is bent toward the inside in the shape of a circular arc. Each desired breaking point 36, 37, in the embodiment, is formed by a diminished cross-section of the covering part 27, 28. In the case of a lateral crash impact, the desired breaking point 36 on the door side interacts with a radii-shaped area 38 of the vehicle side member 5 and is broken open by it. The desired breaking point on the side-member side interacts with the free end of the hook 15 (horizontal wall section 19 or web 20) so that, in the case of a lateral crash impact, it penetrates the desired breaking point 37 and breaks it open.

The door hooking arrangement 12 may extend along the whole length of the door 2 or may be provided only locally. In addition, the door hooking arrangement 12 may also be provided laterally at the front or the rear or also at the top of the door 2.

Although the invention has been described and illustrated in detail, it is to be clearly understood that the same is by way of illustration and example, and is not to be taken by way of limitation. The spirit and scope of the present invention are to be limited only by the terms of the appended claims.

WHAT IS CLAIMED:

1. A door hooking arrangement on motor vehicles for the protection against a lateral impact in the case of accidents with a hook being arranged which forms a hooking element at least in the lower area of the door, said hook interacting with a receiving device provided on the exterior vehicle side member in the case of a lateral crash impact on the door in a hooking manner, wherein the hook and receiving device are covered by covering parts in the normal condition and wherein, in the case of a lateral crash impact on the door, starting from a defined effect of force, wall sections of the covering parts arranged adjacent to the hook and receiving device break open and release the hook and receiving device.

2. A door hooking arrangement according to claim 1, wherein a door-side covering part covers a lower area of the door with a reinforcing plate and the hook.

3. A door hooking arrangement according to claim 1, wherein a side-member side covering part covers an exterior area of the vehicle side member together with the receiving device.

4. A door hooking arrangement according to claim 1, wherein the receiving device is formed by a recess-shaped indentation of the exterior vehicle side member onto which an angular closing part is placed which has a slot opening on the side facing the hook.

5. A door hooking arrangement according to claim 3, wherein the receiving device is formed by a recess-shaped indentation of the exterior vehicle side member onto which an angular closing part is placed which has a slot opening on the side facing the hook.

6. A door hooking arrangement according to claim I, wherein the wall sections of the covering parts which break open are constructed as desired breaking points.

7. A door hooking arrangement according to claim 6, wherein each desired breaking point is formed by a diminished cross-section of the covering part.

8. A door hooking arrangement according to claim 6, wherein the door-side desired breaking point starts adjacent to the hook and extends approximately to a diagonally extending wall section of the inside panel disposed above it.

9. A door hooking arrangement according to claim 7, wherein the door-side desired breaking point starts adjacent to the hook and extends approximately to a diagonally extending wall section of the inside panel disposed above it.

10. A door hooking arrangement according to claim 6, wherein the desired breaking point of the covering part on the side-member side is disposed in front of the slot opening of the receiving device.

11. A door hooking arrangement according to claim 1, wherein both covering parts have a circular-arc-shaped course in the area of the desired breaking points.

12. A door hooking arrangement according to claim 6, wherein both covering parts have a circular-arc-shaped course in the area of the desired breaking points.

13. A door hooking arrangement according to claim 6, wherein the door-side desired breaking point, in the case of a lateral crash impact, interacts with an opposite rounded area of the vehicle side member.

14. A door hooking arrangement according to claim 6, wherein the desired breaking point of the covering part on the side-member side, in the case of a lateral crash impact, interacts with the door side hook.

* * * * *